3,453,210
GREASE-LIKE SILICONE COMPOUND
John H. Wright, Elnora, N.Y., assignor to General Electric Company, a corporation of New York
No Drawing. Filed Oct. 25, 1966, Ser. No. 589,213
Int. Cl. C10m 7/02
U.S. Cl. 252—28                                                  7 Claims

ABSTRACT OF THE DISCLOSURE

Grease-like or putty-like compositions consisting of (1) 100 parts of a liquid organopolysiloxane having a viscosity of from 50 to 200,000 centistokes at 25° C., (2) from 3 to 25 parts of finely divided silica, and (3) from about 4.5 to 150 parts of finely divided polytetrafluoroethylene, with the polytetrafluoroethylene being present in an amount equal to from 1.5 parts to 15 parts per part of said finely divided silica.

---

This application is directed to a grease-like organosilicon compound comprising a silicone fluid and specific thickening agents.

Grease-like silicone compounds are well known in the art and are generally prepared by thickening a conventional silicone fluid with a thickening agent. Typical thickening agents have included finely divided materials, such as silica and various metal soaps common to the lubricating art. These grease-like silicone materials have generally not been employed as lubricants except under extreme temperature or special conditions, because other materials are far better lubricants than silicones in the usual temperature range. However, the silicone grease-like materials have had unusual advantages in that they have extremely high dielectric strengths over a wide temperature range and have remained liquid as distinguished from solid or gaseous over a wide temperature range. The primary uses of these organopolysiloxanes have been as dielectric greases used to coat ceramic surfaces to prevent corona discharge and these materials with suitable additives, such as methyl hydrogen polysiloxanes, have been used as corrosion resistant grease compounds for elevated temperature uses.

While these grease-like silicones have been extremely useful in a number of applications, they have been unsatisfactory in applications which require a grease having the property of internal lubrication, particularly over wide temperature ranges. Internal lubrication is a property which is almost impossible to define in numbers, but which relates to the ability of a grease to withstand mechanical stress and strain without undergoing radical changes in consistency. It is perhaps simplest to describe this property of internal lubrication in terms of conventional silicone greases which do not have this property used in applications which require the property. For example, when a silica-filled silicone grease is used as the damping medium in a dashpot, it it sometimes found that the stress and strain to which the grease is subjected in the dashpot causes separation of the grease into one part which is hard and another which is very soft. Ideally, in the operation of a dashpot, one portion of the grease should slide over another portion without this radical change in consistency. A material in which one portion slides over another is defined as a material having internal lubrication.

Sometimes it is found that a silicone grease exhibiting this property of internal lubrication, for example in dashpot applications, exhibits the property at one end of a desirable temperature range, for example, at a temperature of 400° F., but fails to exhibit the property at room temperature. Such a grease at temperatures of −65° F. might even be a solid. Thus, this material might show internal lubrication at the high temperature but not at moderate or low temperatures.

Another illustration of situations in which internal lubrication with a conventional silicone grease is not found is in connection with mechanical systems, such as tanks designed to hold liquids at extremes of temperature and where the tank is subjected to severe mechanical strain. In such case, sections of the tank cannot be rigidly joined together and must be adapted for some relative movement. In such cases, a desirable method of sealing the tank or vessel to prevent leakage of its contents is to provide a channel where sections of the container come together, and to fill such channel with a grease-like material. The only practical method for filling these channels is to use grease type fittings, such as automotive grease fittings, and to extrude the grease under high pressure through the fittings into the channel. When an attempt is made to use a conventional grease-like silicone composition in this application, it is found that a material with a hard enough consistency to stay in the channel shows radical phase separation when attempts are made to extrude the material into the channel through the grease fitting. Even after the material is extruded under these adverse conditions into the channel, it is sometimes found that relative movement between the sections of the tank subject the grease to a sufficient change that a radical change in consistency and even gaps in the grease in the channel occurs. This, of course, results in unacceptable leakage of the contents of the tank. A material which could be extruded into the channel and which would not undergo a radical change in consistency in the channel could be described as a material with internal lubrication.

The present invention is based on my discovery of an organopolysiloxane of grease-like or putty-like consistency which does have the desired internal lubrication characteristics desired in many applications, not only at room temperature but at elevated temperatures and temperatures significantly below zero. This composition comprises, by weight, (1) 100 parts of a liquid organopolysiloxane having a viscosity of from 50 to 200,000 centistokes at 25° C. and having the average formula:

(1) 

where R is a member selected from the class consisting of monovalent hydrocarbon radicals, halogenated monovalent hydrocarbon radicals and cyanoalkyl radicals and $n$ has a value of about from 2.001 to 2.05, (2) from about 3 to 25 parts of a finely divided silica and (3) from about 4.5 to 150 parts of finely divided polytetrafluoroethylene, with the polytetrafluoroethylene being present in an amount equal to from 1.5 to 15 parts per part of said finely divided silica.

With the composition described above, a range of compositions is obtained which can vary from greases of very high penetrations (i.e., very soft) to greases of very low penetration (i.e., quite hard). The general consistency of the grease and its penetration is primarily a function of the amount of finely divided silica incorporated therein. When the amount of silica is in the range of 3 to 5 parts per 100 parts of the liquid organopolysiloxane, the grease tends to be rather soft. At the upper end of the range of silica, the grease is hard. The amount of polytetrafluoroethylene in the composition affects the internal lubrication, but has a much less significant effect on its consistency. When the polytetrafluoroethylene is used alone without the finely divided silica, the product is not a grease. Instead, with amounts of polytetrafluoroethylene up to around 50 parts per 100 parts by weight of the liquid, the composition is merely a liquid having a dispersed solid therein. When additional polytetrafluoroethylene is added, the composition suddenly turns from a liquid to a hard solid. When the total amount of polytetrafluoroethylene in the composition is greater than about 150 parts per 100 parts of liquid, the ratio of filler to fluid is so high that again the composition cannot be called grease-like, and is not workable. Any internal lubricity is masked by the basic hardness of the composition.

The organopolysiloxane fluids employed in the compositions of the present invention are known in the art and comprise a wide variety of organopolysiloxanes in which the R group of Formula 1 can represent many different radicals. Illustrative of the groups represented by R of Formula 1 are alkyl radicals, e.g., methyl, ethyl, propyl, octyl, butyl, octadecyl, etc. radicals; aryl radicals, e.g., phenyl, tolyl, xylyl, naphthyl, etc. radicals; aralkyl radicals, e.g., benzyl, phenylethyl, etc. radicals; alkenyl radicals, e.g., vinyl, allyl, etc. radicals; cycloaliphatic hydrocarbon radicals, e.g., cyclohexyl, cycloheptyl, cyclohexenyl, etc. radicals; halogenated monovalent hydrocarbon radicals, e.g., chloromethyl, dibromophenyl, perfluoromethylphenyl, perfluoromethylethyl, gamma-chloropropyl, gamma-bromophenyl, gamma-iodopropyl, etc. radicals; cyanoalkyl radicals, e.g., cyanomethyl, alpha-cyanomethyl, beta - cyanomethyl, beta - cyanopropyl, gamma-cyanopropyl, omega-cyanobutyl, etc. radicals. Regardless of the nature of the organopolysiloxane it is preferred that at least 50% of the radicals represented by R be methyl radicals.

In defining the organopolysiloxane fluid of Formula 1, it has been stated that the viscosity of this fluid is in the range of from 50 centistokes to 200,000 centistokes at 25° C., and that there are present from 2.001 to 2.05 silicon-bonded R groups per silicon atom. This variation in viscosity and R groups is, of course, common in the silicone fluid art and it is known that the higher the ratio of R groups to silicon atoms, the shorter will be the molecule and the lower will be the viscosity. Conversely, the lower within the range described above the number of R groups per silicon atom, the higher will be the molecular weight and the viscosity.

While the average formula for the liquid organopolysiloxane has been described as above, it should be observed that this liquid organopolysiloxane consists of various siloxane units. The predominant siloxane unit in these materials is a diorganosiloxane unit of the formula $R_2SiO$, but the organopolysiloxanes must also contain some triorganosiloxane units of the formula $R_3SiO_{0.5}$ in order to reach the proportions required by the formula of Example 1. These organopolysiloxanes can also consist of both triorganosiloxane units of the type described above and monoorganosiloxane units having the formula $RSiO_{1.5}$, so long as the ratios of the various units comprising the organopolysiloxane liquid are such as to provide the average composition of Formula 1. The various siloxane units, even though all are diorganosiloxane units, need not be the same. For example, the organopolysiloxane can comprise dimethylsiloxane units and methylphenylsiloxane units, or dimethylsiloxane units and diphenylsiloxane units, or methylphenylsiloxane units and methyl-beta-cyanoethylsiloxane units. The selection of the particular siloxane units is within the skill of those in the art.

Sometimes the particular organic group of the organopolysiloxane can affect the over-all characteristics of the final product. For example, one of the characteristics often desired in an organopolysiloxane material is solvent resistance. Solvent resistance of the organopolysiloxane can be enhanced by employing polar groups for the organic radicals. In fact, one of the preferred compositions of the present invention employs a liquid organopolysiloxane which consists of a trimethylsilyl chain-stopped methyl-beta-cyanoethylsiloxane. This composition has the improved internal lubrication characteristics which are basic to the present invention, and also exhibits improved resistance to the effect of hydrocarbon solvents. In other cases, it is desirable to improve the general low temperature properties of the compositions of the present invention. In line with present knowledge, the incorporation of some silicon-bonded phenyl groups in the organopolysiloxane liquid improves this property.

While the organopolysiloxane fluid has been described with reference to being a single type of material, it is very often desirable and forms one embodiment of the present invention, to use a blend of different organopolysiloxane fluids. The use of blends is desirable in those instances in which it is desirable that the shear ratio of the composition be maintained as steady as possible over a very broad temperature range, e.g., a range of from about −65° F. to 400° F. The shear ratio is the ratio of the apparent viscosity of the composition under shear to the actual viscosity. It is found that compositions having these desirable shear ratios can be obtained employing as the organopolysiloxane liquids a blend of a high viscosity organopolysiloxane and a low viscosity organopolysiloxane. The high viscosity organopolysiloxane is generally polydiorganopolysiloxane (which can be trimethylsilyl chain-stopped) having a viscosity in excess of about 100,000 centistokes at 25° C., where the organic groups are within the scope of the groups defined for R of Formula 1. The low viscosity material is generally a fluid having a viscosity of from about 20 to 1000 centistokes and can comprise a conventional organopolysiloxane within the scope of Formula 1 in which the organic groups are of the same type as described with respect to the fluid of Formula 1.

The proportions of the two silicone fluids are selected so that the blend viscosity is within the range of from about 50 centistokes to 200,00 centistokes at 25° C. The blend viscosity of a mixture of organopolysiloxanes is well known in the art and is defined by the following formula:

(2) $\log n_B = X_1 \log n_1 + X_2 \log n_2$ where $\log n_B$ is equal to the log of the viscosity of the blend, $X_1$ is the fraction of the first silicone fluid in the blend, $\log n_1$ is the log of the viscosity of the first silicone fluid in the blend, $X_2$ is the fraction of the second silicone fluid in the blend, and $\log n_2$ is the log of the viscosity of the second silicone fluid. Employing Formula 2, the two silicone fluids are selected so as to provide the desired viscosity in the fluid blend.

This blended fluid is used with the finely divided silica and the finely divided polytetrafluoroethylene in the proportions previously described to produce compositions having improved internal lubrication and also having a relatively steady shear ratio from one temperature extreme to another. This characteristic makes compositions of this type extremely valuable for use as damping fluids in dashpots and other mechanical systems in which the dampening characteristic of the grease-like composition is required over a broad temperature range.

The finely divided silica fillers employed in the compositions of the present invention are well known in the art. In general, these silicas are sufficiently fine so as to have a relatively high surface area per unit volume. In general, these finely divided silicas have a surface of at least 1 square meter per gram. Most preferable silicas are those having a surface area of between about 4 and 400 or more square meters per gram. The preparation of these silicas is described, for example, in "Natural and Synthetic High Polymers," by K. H. Meyer, page 85, (1942), and in Hurd "Chemical Reviews" vol. 22, No. 3, page 403 (1938). The silicas useful for my invention are those having numerous pours or voids therein and include precipitated silica, silica aerogel and fumed silica. All of such silicas are chemically similar, but sometimes differ among themselves in particle size and particle shape and vary in surface area as measured in square meters per gram. Chemically, each of these silicas contains a plurality of silicon-oxygen-silicon linkages which combine the atoms and particles together and all of these silicas contain hydroxyl groups attached to their surfaces through silicon-oxygen linkages. In addition to ordinary silica, where it is desired to impart water leach resistance to the grease-like organopolysiloxane, a portion of the silica filler, for example, from 10 to 90 percent by weight of the silica filler, can be a finely divided silica having its surface coated with octamethylcyclotetrasiloxane as described in my Patent 3,037,933 issued June 5, 1962.

The finely divided polytetrafluoroethylene employed in the practice of the present invention is a material well known in the art and is readily available under the tradename Teflon from E. I. du Pont de Nemours & Company of Wilmington, Del.; under the trade name Rilube No. 63 from the Modern Industrial Plastics Division of the Duriron Company, Dayton, Ohio; and under the trade name TL-126 from the Liquid Nitrogen Processing Corporation, Malvern, Pa. It is desirable that the polytetrafluoroethylene be employed as a fine powder, for example, as a powder of particles having an average particle size of from about 1 to 50 microns, but including some particles having diameters as low as 0.1 to as high as 100 microns or more in diameter.

In preparing the compositions of the present invention, the liquid organopolysiloxane of Formula 1 is merely mixed with the finely divided silica or mixture of finely divided silica and octamethylcyclotetrasiloxane coated silica and with the finely divided polytetrafluoroetylene in any suitable fashion. The most convenient method for preparing the mixture is in a grease mill, which is any apparatus which subjects the mixture to a shearing action. A typical apparatus to provide such shearing action is a conventional three-roll paint mill and the components are mixed on such three-roll paint mill until thoroughly blended. After the materials are thoroughly blended, the products of this invention are ready for use. The blending can take place at any temperature with no apparent reason being observed for blending the materials at any temperature other than room temperature. Where the liquid organopolysiloxane of Formula 1 is actually a mixture of materials, the mixture is first prepared and then mixed with the other components of the grease-like composition for easiest preparation. However, even in the case where two different fluids are employed, it is not essential that the fluids be premixed before blending with the finely divided silica and the finely divided polytetrafluoroethylene.

In addition to the liquid organopolysiloxane, the finely divided silica, and the polytetrafluoroethylene which are the essential components of the grease-like compositions of the present invention, it is sometimes desirable to modify these compositions by the incorporation of various well known stabilizing agents to further improve the mechanical stability of such compositions. The use of such stabilizers is more likely with grease-like compositions having lower silica loading within the range previously described, for example, with silica loadings of the order of from 3 to 12 parts by weight filler per 100 parts of the liquid polysiloxanes. One of the most useful classes of stabilizers is the polyalkylene glycols and the monoalkyl ethers of such polyalkylene glycols. These polyalkylene glycol materials can be described generically as having the formula:

(3) 

where R' is a member selected from the class consisting of hydrogen and lower alkyl radicals containing from 1 to 7 carbon atoms, $a$ and $b$ are integers equal to from 1 to 4, inclusive, $x$ is an integer equal to from about 4 to 50, or more, and preferably from 5 to 20, inclusive, and $y$ is a whole number equal to from about 0 to about 50. These compounds can be prepared, for example, by forming polyalkylene glycols of ethylene glycol, propylene glycol, or butylene glycol. These polyalkylene glycols are in turn reacted with a monohydric saturated aliphatic alcohol containing from 1 to 7 carbon atoms to form the monoether. A composition containing two different alkylene oxide groups can be prepared, for example, by reacting a polypropylene glycol with ethylene oxide in the presence of boron trifluoride. The mixed polyalkylene glycol, if desired, can then be reacted with an alkaneol, such as butnaol, to form the monobutoxyether of the mixed polyalkylene glycol. A number of these polyalkylene oxide materials are commercially available, including the materials sold under the trade name "Ucon" by Union Carbide Corporation and the material sold under the name "Pluracol" by the Wyandotte Chemicals Corporation. When these stabilizers are added to the compositions of the present invention, they are present in an amount up to about 3 parts by weight per 100 parts by weight of the liquid organopolysiloxane.

An additional type of stabilizer useful in the compositions of the present invention are the boron compounds described and claimed in my Patent 3,103,491 which issued Sept. 10, 1963. These boron compounds are members selected from the class consisting of boric acid, trimethoxyboroxine and trialkylborates in which the alkyl radicals contain from 1 to 5 carbon atoms. These boron compounds are added in an amount sufficient to provide from 0.001 part by weight to 1.0 part by weight boron per 100 parts by weight of the silicone fluid. As described in my aforementioned patent, in addition to the boron compounds, pentaerythritol can be added in combination with the boron compounds to further stabilize the grease compositions. When pentaerythritol is added in combination with the boron compound, the pentaerythritol is employed in an amount up to about 5 parts by weight, and preferably from 0.25 to 4.0 parts by weight per part of the boron compound.

Where any of the stabilizers described above are added to the compositions of the present invention, the additives are merely mixed with the silicone oil, the finely divided silica, and the finely divided polytetrafluoroethylene, either prior to or during the blending of these components into a grease-like or putty-like composition.

The following examples are illustrative of the practice of my invention and are not intended for purposes of limitation. All parts are by weight.

Example 1

In this example, a number of different organopolysiloxane materials were prepared by milling various additives into a trimethylsilyl chain-stopped polymethyl-beta-cyanoethylsiloxane containing an average of about 60 methylbeta-cyanoethylsiloxane units per molecule and having a viscosity of about 50,000 centistokes at 25° C. To this fluid, which is referred to in this example as the cyanoethyl silicone, was added varying amounts of one or more of the following materials. The first material was a silica aerogel having a surface area of about 150–175 square meters per gram. Another material, the treated silica, was a silica aerogel which had been mixed in the ratio of 100 parts of the silica to 20 parts of octamethylcyclotetrasiloxane. The mixture was then heated with agitation at a temperature of about 200° C. for two hours to insure thorough diffusion of the octamethylcyclotetrasiloxane through the silica, and to insure that any excess octamethylcyclotetrasiloxane not required to coat the silica was evaporated from the reaction mixture. The finely divided polytetrafluoroethylene (referred to as PTFE in this example) was a commercial powder having an average particle size of about 10 microns. The glycol was a monobutyl ether of a polypropylene glycol having a viscosity at 100° F. of about 1100 saybolt universal seconds. Each of the compositions was prepared by mixing all of the components and then adding the mixture to a three-roll paint mill through which the mixture was passed five times. The table below lists the parts by weight of each of the components used in the various mixtures, and following the table are comments concerning each of the mixtures. It should be noted that the materials of Runs Nos. 1 through 3 are compositions within the scope of the present invention, while the compositions of Runs Nos. 4 through 10 are outside of the scope of this invention.

coupled with the absence of polytetrafluoroethylene, renders this grease so unstable that it reverts to a dispersion of silica in the silicone fluid upon standing. Therefore, this composition is unsatisfactory for any grease application.

TABLE I

| Run No. | 1 | 2 | 3 | 4 | 5 | 6 | 7 | 8 | 9 | 10 |
|---|---|---|---|---|---|---|---|---|---|---|
| Cyanoethyl silicone | 100 | 100 | 100 | 100 | 100 | 100 | 100 | 100 | 100 | 100 |
| Silica aerogel | 20 | 12 | 3 | 15 | 40 | 33 | 10 | 10 | | |
| Treated silica | | 12 | | | | | | | | |
| PTFE | 100 | 125 | 45 | 15 | 100 | | | | 100 | 150 |
| Glycol | | | | | | 1 | 1 | | | |
| Pentaerythritol | | | | | | 1 | 1 | | | |
| Trimethoxy boroxine | | | | | | 1 | 1 | | | |

The organopolysiloxane composition of Run No. 1 was within the scope of the present invention and was a workable putty-like material which could be extruded without difficulty through a grease fitting into a channel having a semi-circular cross-section of 300 mils diameter and which was formed by clamping two plates together, one of which contained the channel. The nature of the compound in the channel was examined by unclamping the two plates. Likewise, examination of the composition under various shear conditions showed a rather flat change in apparent viscosity at both room temperature as well as temperatures as low as −65° F. and temperatures as high as 400° F. This material was also very resistant to the potential leaching effect of hydrocarbon solvents. The composition of Run No. 2 exhibited all of the desirable properties of the composition of Run No. 1 and, in addition, was also quite resistant to the leaching effect of water. The composition of Run No. 3 was much softer than the compositions of Runs 1 and 2, but nevertheless showed a high degree of internal lubricity, as evidenced by its ability to be extruded into a channel.

The composition was stable over a wide temperature range as indicated by its relatively low rate of change of apparent viscosity as a function of temperature.

The composition of Run No. 4 is outside of the scope of this invention by virtue of the low amount of polytetrafluoroethylene. This low amount reduces the ratio of the polytetrafluoroethylene to silica below the 1.5 to 1 minimum. The use of this unacceptably low amount of polytetrafluoroethylene results in a hard material which has very little internal lubrication and which cannot be extruded at low temperatures. In addition, the change in apparent viscosity under shear as a function of temperature is unacceptably large. The composition of Run No. 5 is outside of the scope of the present invention by virtue of the high amount of silica, which is above the 25 parts silica maximum of the present invention. The result of this high amount of silica is that the product is a rubber-like material which is not grease-like or putty-like and, therefore, cannot be spread or extruded into the locations at which it is to be used. In addition, the composition crumbles upon vibration. The composition of Run No. 6 is also outside of the scope of the present invention by virtue both of the presence of more than the 25 parts maximum silica and of the absence of the PTFE. This composition is hard and waxy with no internal lubrication and cannot be extruded. In addition, the composition cracks upon exposure to high temperatures.

The composition of Run No. 7 is outside of the scope of the present invention by virtue of the absence of polytetrafluoroethylene. While this composition is a good, stable grease by virtue of the silica filler and the various stabilizing additives present therein, nevertheless, the apparent viscosity of the grease varies too greatly with temperature under shear. While the grease is very satisfactory for many applications at room temperature and at elevated temperatures, when an attempt is made to use the grease at temperatures around −40° F., the grease is hard and cracks and loses its adhesion and, therefore, is unsatisfactory. The composition of Run No. 8 differs from that of Run No. 7 in that the stabilizing additives are absent and the absence of these stabilizing additives, The composition of Run No. 9 is outside of the scope of the present invention in that no finely divided silica is present. The absence of the silica makes it impossible to provide a composition of uniform consistency and, therefore, the material cannot be made grease-like or putty-like. Therefore, the composition cannot be used in applications requiring grease-like materials with internal lubrication. The composition of Run No. 10 also lacks any silica and contains more polytetrafluoroethylene than the composition of Run No. 9. The increased amount of polytetrafluoroethylene makes it even more impossible to approach a uniform consistency and, therefore, the composition is unsatisfactory.

Example 2

This example illustrates the preparation of a number of additional compositions within and without the scope of the present invention from a different group of silicone fluids than the preceding example and with a different filler and polytetrafluoroethylene. In particular, in this example there is shown by Runs Nos. 11 through 14, the preparation of a class of preferred compositions of the present invention in which the organopolysiloxane is a blend of two different organopolysiloxane materials, which are blended according to Formula 2 to produce the desired viscosity at 25° C. In Run No. 15, a composition within the scope of the present invention is shown in which the liquid silicone is only a single material, while in Runs 16 and 17 there are shown compositions outside of the present invention by virtue of the absence of either finely divided silica or polytetrafluoroethylene. All of the proportions of the various components employed in this example are shown in Table II. Table II also shows the viscosity of the fluid blend and the components employed in the manufacture of the blend. The various components are identified as "Me–1,000,000" to cover a trimethylsilyl chain-stopped polydimethylsiloxane having a viscosity in excess of 1,000,000 centistrokes at 25° C., "Me–100,000" to describe a trimethylsilyl chain-stopped polydimethylsiloxane fluid having a viscosity of 100,000 centistokes at 25° C., "Me–30,000" to describe the 30,000 centistoke silicone fluid of the same type described above, "Me–1,000" to describe a trimethylsilyl chain-stopped polydimethylsiloxane having a viscosity of 1,000 centistokes at 25° C. "Me–50" describes a methylpolysiloxane fluid which is trimethylsilyl chain-stopped, but which is branched chain by virtue of the presence of 6 mole percent monomethylsiloxane units and which fluid has a viscosity of 50 centistokes at 25° C. "MePh–50" describes a trimethylsilyl chain-stopped copolymer of dimethylsiloxane units and methylphenylsiloxane units containing 5 mole percent methylphenylsiloxane units and having a viscosity of 50 centistokes at 25° C. The silica referred to in Table II is a finely divided precipitated silica having a surface area of 300–350 square meters per gram. The "PTFE" referred to in the table is a polytetrafluoroethylene having an average particle size of about 20 microns and "TMB" is an abbreviation for trimethoxyboroxine. All of the compositions described in the table were prepared by the same techniques described for the compositions described in Example 1.

TABLE II

| Run No. | 11 | 12 | 13 | 14 | 15 | 16 | 17 |
|---|---|---|---|---|---|---|---|
| Fluid viscosity | 30,000 | 30,000 | 30,000 | 30,000 | 30,000 | 30,000 | 30,000 |
| Me-1,000,000 | 16 | 16 | | | | 16 | 16 |
| Me-100,000 | | | 83 | 85 | | | |
| Me-30,000 | | | | | | 100 | |
| Me-1,000 | | | | | 15 | | |
| Me-50 | 84 | | 17 | | | 84 | 84 |
| MePh-50 | | 84 | | | | | |
| Silica | 5 | 5 | 5 | 5 | 5 | 5 | |
| PTFE | 25 | 25 | 25 | 25 | 25 | | 25 |
| TMB | 0.5 | 0.5 | 0.5 | 0.5 | 0.5 | 0.5 | 0.5 |

The composition of Run No. 11 is one of the preferred compositions of the present invention, being a blend of a very high viscosity material and a low viscosity material to produce a material with a blend viscosity of 30,000 centistokes when measured at 25° C. This material is characterized by very high mechanical stability and by good internal lubrication, in that the material can be extruded and can be worked to the desired degree without separation into its various component parts and without cracking or breaking. The change in apparent viscosity with temperature at various rates of shear for this composition is also very low. This fact is illustrated in Table III which charts the apparent viscosity of the composition of Run No. 11 at various shear rates as a function of temperature. The apparent viscosity in the table is listed in poise and the shear rates are listed in reciprocal seconds. These data are representative of a grease composition showing an unusually low change of viscosity into shear with temperature.

TABLE III.—APPARENT VISCOSITY (CENTISTOKES)

| Temperature, °F. | Shear rate, sec.$^{-1}$ | | |
|---|---|---|---|
| | 100 | 1,000 | 10,000 |
| −40 | 40,000 | 13,000 | 4,700 |
| 50 | 24,000 | 6,000 | 1,500 |
| 165 | 22,000 | 5,000 | 1,200 |

The grease compositions of Runs 12, 13, and 14 are also typical of a grease composition of unusual stability, high internal lubrication and a flat viscosity versus temperature at high shear which is typical of the composition of Run 11.

In Run No. 15 is shown a composition within the scope of the present invention in which the organopolysiloxane fluid is a single fluid rather than a blend of materials as in Runs 11 through 14. While the composition of Run No. 15 is not within the preferred embodiment mentioned, the composition is also characterized by high internal lubrication, by stability over a wide temperature range, and a viscosity versus temperature curve which is not as flat as the curves for materials for Runs Nos. 11 through 14, but which is very satisfactory for many applications and which is far superior to much of the prior art.

The composition of Run No. 16 is outside of the scope of the present invention by virtue of the absence of polytetrafluoroethylene. This material has a satisfactory consistency at very low temperatures, but exhibits poor internal lubrication at room temperature and elevated temperatures, and has a very wide variation in apparent viscosity with temperature. The material of Run No. 17, which contains no silica, is simply not a grease or putty-like composition and cannot be made to a uniform consistency or even to any consistency which remains constant.

While the many runs in the foregoing examples have illustrated a number of embodiments of my invention, as well as comparative data for compositions outside of the scope of this invention, it should be understood that my invention is directed broadly to the class of compositions previously described which are characterized by the presence of specific proportions of finely divided silica and finely divided polytetrafluoroethylene in many types of liquid organopolysiloxanes of the type illustrated, as well as many other types of organopolysiloxanes within the preferred range. Each of the compositions within the scope of the present invention is prepared in the same general manner by merely blending the compositions in a typical fashion to a grease-like or putty-like composition.

What I claim as new and desire to secure by Letters Patent of the United States is:

1. An organopolysiloxane composition of grease-like or putty-like consistency of improved internal lubricity and improved viscosity-temperature characteristics comprising, by weight, (1) 100 parts of a liquid organopolysiloxane having a viscosity of from 50 to 200,000 centistokes at 25° C. and having the average formula:

$$R_n SiO_{\frac{4-n}{2}}$$

where R is a member selected from the class consisting of monovalent hydrocarbon radicals, halogenated monovalent hydrocarbon radicals and cyanoalkyl radicals and $n$ has a value of from 2.001 to 2.05, (2) from 3 to 25 parts of a finely divided silica, and (3) from about 4.5 to 150 parts of a finely divided polytetrafluoroethylene, with the polytetrafluoroethylene being present in an amount equal to from about 1.5 parts to 15 parts per part of said finely divided silica.

2. An organopolysiloxane composition of claim 1 in which said liquid organopolysiloxane is a trimethylsilyl chain-stopped methyl-beta-cyanoethylpolysiloxane.

3. An organopolysiloxane composition of claim 1 in which said finely divided silica has a surface area of at least one square meter per gram.

4. An organopolysiloxane composition of claim 1 in which said finely divided polytetrafluoroethylene has an average particle size no greater than about 100 microns.

5. An organopolysiloxane composition of claim 1 in which said liquid organopolysiloxane is a blend of a first organopolysiloxane having a viscosity of at least about 100,000 centistokes at 25° C. and a second organopolysiloxane having a viscosity of from about 20 to 1,000 centistokes at 25° C., the proportions of said first organopolysiloxane and said second organopolysiloxane being selected to provide the desired viscosity in said blend.

6. An organopolysiloxane composition of claim 1 in which R is methyl.

7. An organopolysiloxane composition of claim 1 in which said silica has a surface area of at least one square meter per gram and in which said polytetrafluoroethylene has an average particle size no greater than about 100 microns.

References Cited

UNITED STATES PATENTS 3,011,975  12/1961  Nitzsche et al. _____ 252—49.6
3,103,491  9/1963   Wright _____ 252—28

DANIEL E. WYMAN, *Primary Examiner.*

I. VAUGHN, *Assistant Examiner.*

U.S. Cl. X.R.

252—49.6